Figure 1:
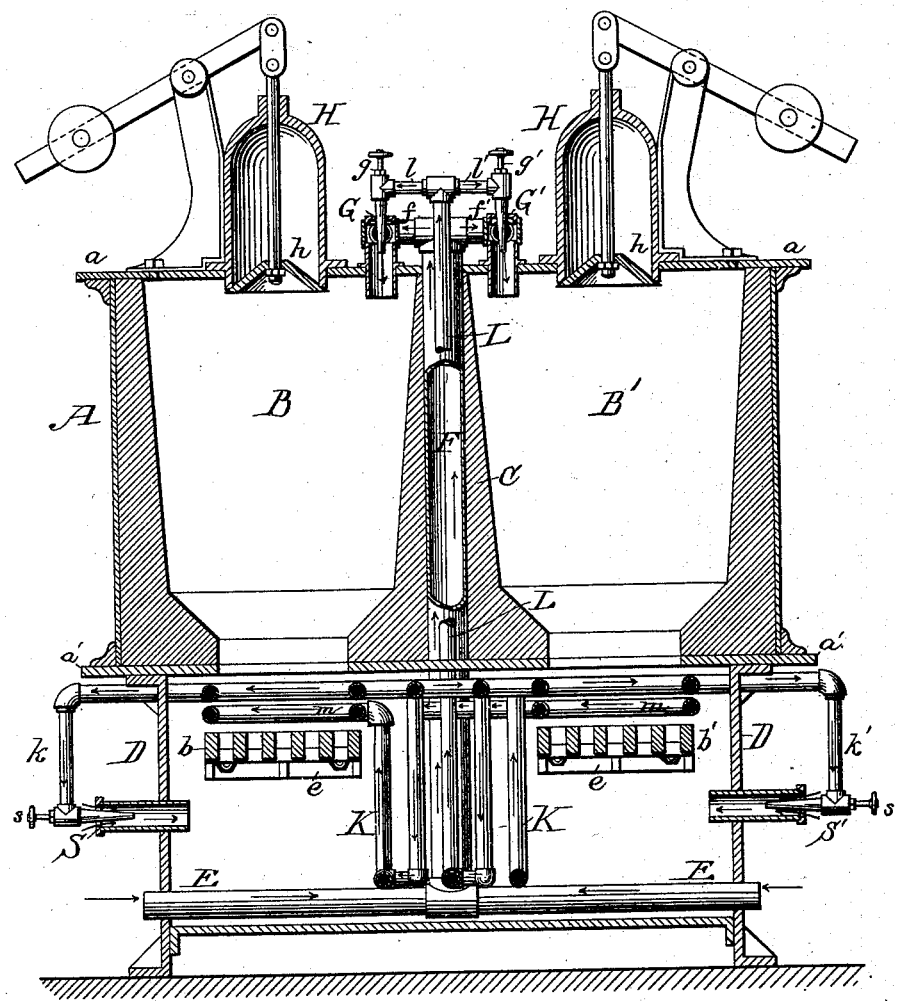

(No Model.)  2 Sheets—Sheet 1.

A. KITSON.
APPARATUS FOR MANUFACTURING NON LUMINOUS HEATING GAS.

No. 410,286.  Patented Sept. 3, 1889.

Witnesses:—
Geo. G. Penney.
Will F. Norton

Inventor:
Arthur Kitson
By E. B. Clark
Atty.

(No Model.) 2 Sheets—Sheet 2.

A. KITSON.
APPARATUS FOR MANUFACTURING NON LUMINOUS HEATING GAS.

No. 410,286. Patented Sept. 3, 1889.

Witnesses:—
Geo. G. Penney
Will T. Norton

Inventor:
Arthur Kitson
By E. S. Clark
Atty.

UNITED STATES PATENT OFFICE.

ARTHUR KITSON, OF PHILADELPHIA, PENNSYLVANIA.

APPARATUS FOR MANUFACTURING NON-LUMINOUS HEATING-GAS.

SPECIFICATION forming part of Letters Patent No. 410,286, dated September 3, 1889.

Application filed December 8, 1888. Serial No. 293,024. (No model.)

*To all whom it may concern:*

Be it known that I, ARTHUR KITSON, a subject of the Queen of Great Britain, residing at Philadelphia, in the county of Philadelphia and State of Pennsylvania, have invented certain new and useful Improvements in Apparatus for Manufacturing Non-Luminous Heating-Gas; and I do hereby declare the following to be a full, clear, and exact description of the invention, such as will enable others skilled in the art to which it appertains to make and use the same.

This invention relates to a gas-generating furnace adapted more particularly for manufacturing non-luminous heating-gas continuously by the injection of steam and air into a body of incandescent fuel, the air serving to promote combustion, while the steam is decomposed and converted into hydrogen and carbonic oxide. The resulting gas is well suited for use in the industrial arts, such as heating and melting metals, driving gas-engines, domestic heating and cooking, and other purposes.

The object of my invention is to provide a compact and conveniently-operated generator capable of rapidly generating gas with a small amount of fuel, so arranged in two bodies as to more perfectly convert deleterious carbonic acid, which is first produced, into combustible carbonic oxide, thereby increasing the heating value of the product; and a more special object is to provide for effectively heating the air and superheating the steam which are injected into the bodies of fuel by the hot gas in its passage from one fuel-chamber to the other in the base of the generator, whereby the heat of the fuel is better maintained and greater economy in operation is effected.

In my improved generator I provide two fuel-chambers and a connecting base-chamber, having arranged in it suitable steam-superheating coils and air-heating pipes in the path of the hot gas which flows from one fuel-chamber to the other, and I extend the steam and air pipes up through the division-wall separating the fuel-chambers and connect them with injectors, one opening into the top of each fuel-chamber. I also connect a chimney-pipe and a gas-take-off pipe with the top of each fuel-chamber, and provide other details of construction which increase the effectiveness of my apparatus, as will be fully described with reference to the accompanying drawings, in which—

Figure 2:
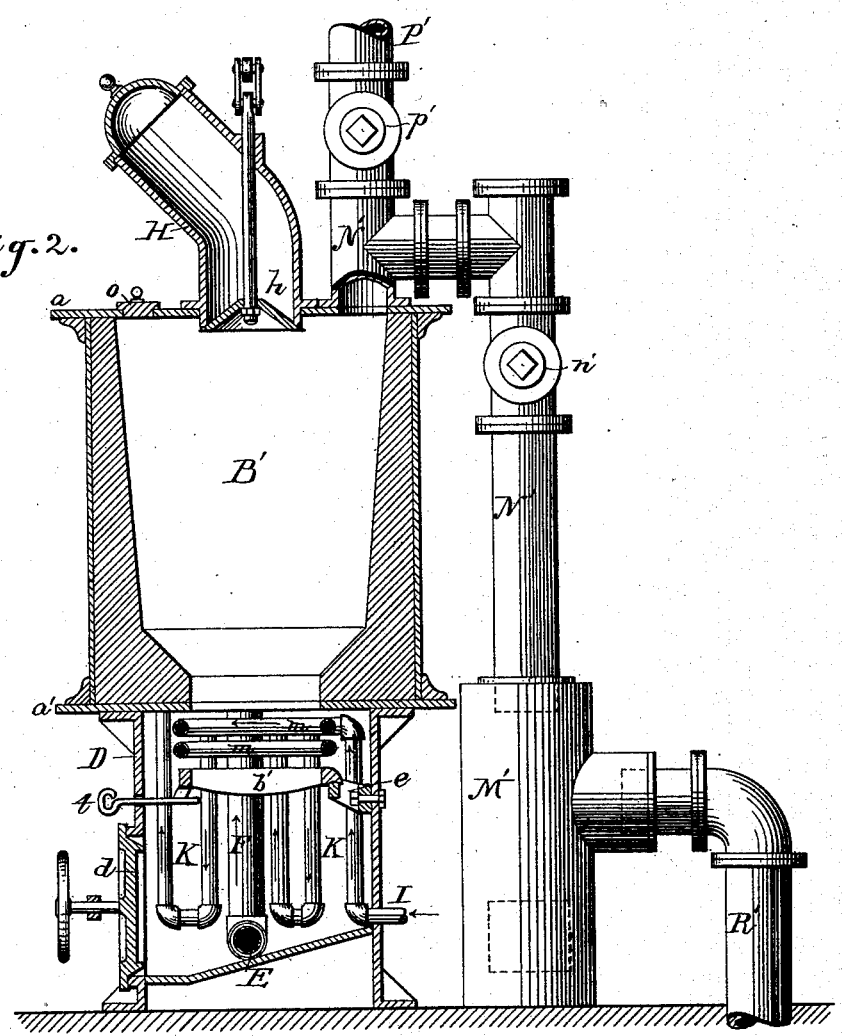
Figure 3:
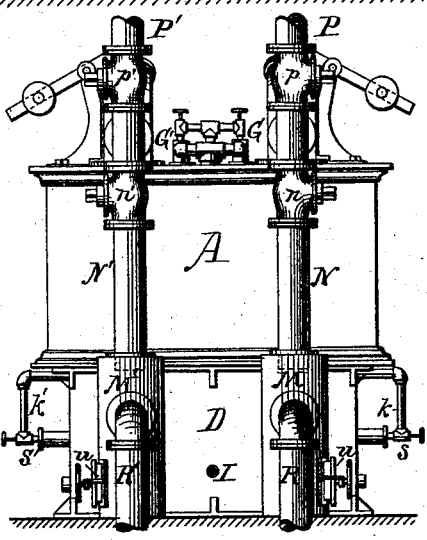

Figure 1 represents a vertical longitudinal section through the apparatus, showing both fuel-chambers. Fig. 2 represents a vertical transverse section on a plane at right angles to that of Fig. 1. Fig. 3 represents a rear elevation of the generator on reduced scale, showing the two gas-take-off pipes.

The iron shell A of the generator has secured to it top plate $a$ and bottom plate $a'$, and is suitably lined with fire-brick or other refractory material and divided by the central vertical transverse partition C into two fuel-chambers B B'. These chambers are mounted upon the base D, which forms a chamber connecting their lower ends and serves as an ash-pit. The grates $b\ b'$ are preferably mounted about three inches below the bottoms of chambers B B', so that coils $m$ may be arranged between them.

The grates are supported at their rear edges upon brackets $e\ e$, which are bolted to the rear wall of base D, and at their front edges upon removable pins $t$, which may be readily withdrawn for letting down the grates when it is desired to remove the cinder and ashes. Ash-doors $d$, having suitable fastening devices, are applied to the front wall of base D. A fuel-supply hopper H, having bottom valve $h$ with a connected weighted lever, is fitted to the top of each fuel-chamber. Air-inlet pipes E project slightly through the walls of base D and connect with vertical pipe F, which passes up through division-wall C, and at the top connects by branch pipes $f\ f'$ with injectors G G', which open downward into chambers B B'. One or more supply-pipes I for steam or water pass through the wall of chamber D and connect with the coils K, arranged in the middle portion of base D. The horizontal coils $m$, arranged between the outer edges of the grates and the lower ends of the fuel-chambers, connect with coils K, and are provided with branches $k\ k'$, extending through the walls to injectors S S'. Valves $s\ s$ control the supply of steam to the injectors. The air-ports of the injectors may be opened or closed by registers. A pipe L extends from coil K up through wall C and connects by branches l l' with injectors G G'.

Valves g g' regulate the volume of steam flowing through the nozzles of the injectors. Pipe L may have one or more coils within wall C for extending the heating-surface. Gas-take-off pipes N N' lead from the tops of chambers B B' and extend into the hydraulic seal-boxes M M', as shown in Fig. 3. A single seal-box might be used instead of two here shown.

Pipes R R' conduct gas to the purifier or place of immediate use. Valves n n' are provided in the take-off pipes. Chimney-pipes P P', having valves p p', rise from pipes N N' and are used for the escape of smoke when required. A door u is provided in each seal-box to permit of its being cleaned. An opening closed by stopper o is provided in the top plate for insertion of a bar to stir the fire.

The generator is operated as follows: The chimney-valves p p' and ash-pit doors d being open, fires are kindled on the grates and coal gradually fed in till well ignited by natural draft. Water is admitted to the coil by pipe I and is quickly converted into steam by circulation in the coils m above the grates. As soon as steam at the desired pressure is formed the doors d are closed and steam is admitted to the injectors S S', by which blasts of air and steam are driven into the fuel and the generation of gas commenced. When gas of the desired quality is generated, the chimney-valves are closed and valves n n' in the gas-take-off pipes opened. When bodies of fuel of sufficient depth are well ignited, the valves of injectors S S' are closed, valve n' is closed, and valve g' of injector G' is opened and a current of highly-heated steam and air admitted into the top of chamber B'. They pass down into the body of highly-heated fuel, where decomposition is effected, and the resulting hot gas passes down into base-chamber D, in contact with the steam and air pipes, imparting to them a high heat, and then pass up into the body of fuel in chamber B, where any carbonic acid which may be present is converted into carbonic oxide and a fixed high-grade heating-gas produced, which escapes from the top of chamber B and passes by take-off pipe N to the seal-box, from which it is conducted to the scrubber, holder, or place of immediate use. After a suitable time, as will be indicated by the condition of the fires, the direction of the blast of air and steam and of the course of the gas is reversed by opening valve n', closing valve n, opening valve of injector G and closing valve of injector G', when gas is generated, as before, but is taken off from the top of chamber B' instead of chamber B. By reversing the direction of the blasts and gas-currents the bodies of fuel are consumed more evenly, the heat is more uniformly distributed and gas of better quality produced.

Whenever found desirable, the fires may be blasted from the bottom to make them more lively by opening the valves of injectors S S'. Since two bodies of fuel are used, the steam is subjected to a greater depth thereof, resulting in better decomposition and a better quality of gas. The two bodies of fuel can also be more quickly heated up than the same quantity of fuel in one body. By means of the downblasts I am enabled to successfully use a cheaper grade of fuel and the ashes are driven into the ash-chamber.

Having described my invention, what I claim, and desire to secure by Letters Patent, is—

1. A gas-generator divided by a vertical partition into two fuel-chambers and having a connecting base-chamber, in combination with a steam and air injector connecting with the top of each fuel-chamber, an air-heating pipe arranged in the generator and connecting with such injectors, and a gas-take-off pipe also leading from the top of each chamber, for the purpose described.

2. In combination with a gas-generator containing two fuel-chambers and a connecting base-chamber, the steam generating and superheating coils located in the base-chamber between the grates of the fuel-chambers, and pipes connecting such coils with steam and air injectors, one for each fuel-chamber, as and for the purpose described.

3. The gas-generator divided by a vertical partition of refractory material into two fuel-chambers and having a connecting base-chamber in combination with an air-heating pipe, and a steam-superheating pipe extending through the dividing-partition and connecting with injectors discharging into the tops of the furnaces, as and for the purpose described.

4. In combination with a gas-generating furnace, the steam and air heating pipes or coils located in the ash-chamber and wall of the generator, and both connecting with a blast-injector arranged to discharge into the fuel of the generator, as and for the purpose described.

5. In combination with the two-chambered generator and a connecting base-chamber, the steam and air blast injector connecting with such base-chamber, and a steam and air blast injector connecting with the top of each fuel-chamber of the generator, whereby the fuel may be blasted either up or down and the current passed from one chamber to the other in either direction for uniformly heating and consuming the fuel, and a mixed gas simultaneously generated from air and steam.

In testimony whereof I affix my signature in presence of two witnesses.

ARTHUR KITSON.

Witnesses:
JAMES S. PHILLIPS,
ALFRED J. LEVINGTON.